United States Patent
Niida

(10) Patent No.: US 8,488,017 B2
(45) Date of Patent: *Jul. 16, 2013

(54) IMAGE PROCESSING APPARATUS TO TRANSMIT MOVING IMAGE DATA

(75) Inventor: Mitsuo Niida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 13/193,909

(22) Filed: Jul. 29, 2011

(65) Prior Publication Data

US 2011/0279728 A1  Nov. 17, 2011

Related U.S. Application Data

(63) Continuation of application No. 12/265,367, filed on Nov. 5, 2008, now Pat. No. 8,077,222.

(30) Foreign Application Priority Data

Nov. 6, 2007 (JP) .................... 2007-288111
Sep. 2, 2008 (JP) .................... 2008-224223

(51) Int. Cl.
  *H04N 5/228* (2006.01)
(52) U.S. Cl.
  USPC ............. 348/222.1; 348/231.2; 348/231.3; 386/241; 386/246

(58) Field of Classification Search
  USPC ............. 348/222.1, 231.2, 231.3; 386/241, 386/246
  See application file for complete search history.

(56) References Cited

U.S. PATENT DOCUMENTS

| | | | |
|---|---|---|---|
| 7,656,948 B2 * | 2/2010 | Seong et al. ............. | 375/240.01 |
| 2003/0215010 A1 * | 11/2003 | Kashiwa .................. | 375/240.02 |
| 2004/0136689 A1 * | 7/2004 | Oka ........................ | 386/52 |
| 2008/0129839 A1 * | 6/2008 | Asukai et al. ............ | 348/231.99 |

FOREIGN PATENT DOCUMENTS

| | | |
|---|---|---|
| JP | 2004-186992 A | 7/2004 |
| JP | 2005-295096 A | 10/2005 |

* cited by examiner

*Primary Examiner* — Antoinette Spinks
(74) *Attorney, Agent, or Firm* — Canon USA, Inc., IP Division

(57) ABSTRACT

An image processing apparatus includes a moving image generating unit, an instruction unit, a control unit, an additional information generating unit, a multiplexing unit, and a transmitting unit. The control unit controls the moving image generating unit in accordance with a frame rate changing instruction provided by the instruction unit such that the frame rate of moving image data generated by the moving image generating unit is changed from a first frame rate to a second frame rate. The additional information generating unit generates additional information indicating a particular period. The multiplexing unit adds the additional information to the moving image data and the transmitting unit transmits the moving image data and the additional information output from the multiplexing unit.

9 Claims, 9 Drawing Sheets

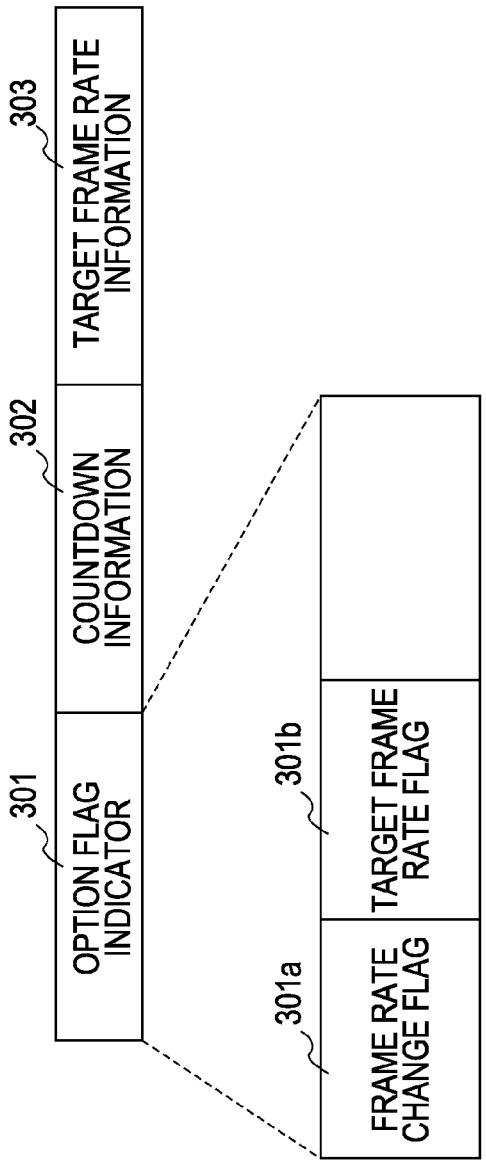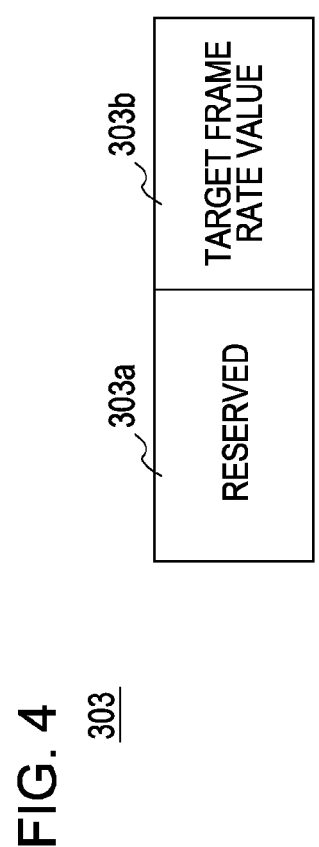
FIG. 3
FIG. 4

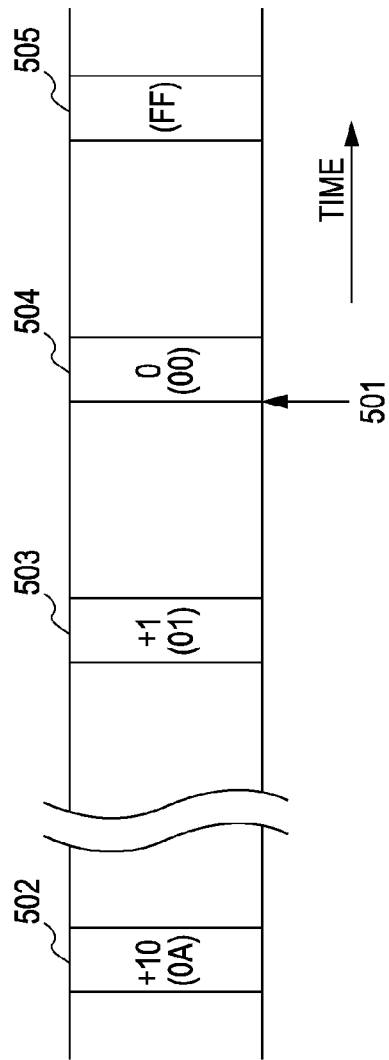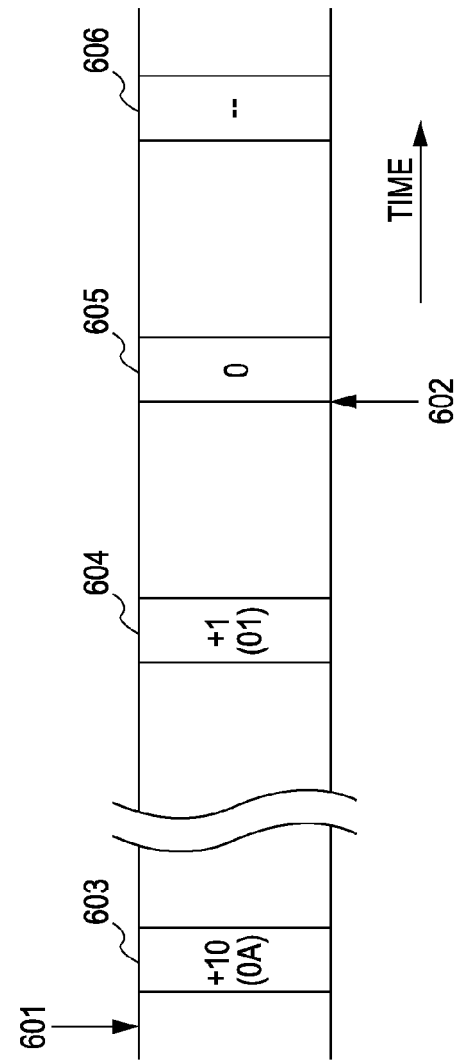
FIG. 5
FIG. 6

FIG. 7

| FRAME RATE CHANGE FLAG (301a) | TARGET FRAME RATE FLAG (301b) | | COUNTDOWN INFORMATION (302) | (RESERVED) | TARGET FRAME RATE VALUE (303b) |
|---|---|---|---|---|---|
| 1 | 1 | 0 | 10 (0A) | 0 | 60 (3C) |

FIG. 8

| FRAME RATE CHANGE FLAG (301a) | TARGET FRAME RATE FLAG (301b) | | COUNTDOWN INFORMATION (302) | (RESERVED) | TARGET FRAME RATE VALUE (303b) |
|---|---|---|---|---|---|
| 1 | 0 | 0 | +1 (01) | 0 | FF |

US 8,488,017 B2

IMAGE PROCESSING APPARATUS TO TRANSMIT MOVING IMAGE DATA

CROSS REFERENCE TO RELATED APPLICATIONS

The present application is a continuation of U.S. patent application Ser. No. 12/265,367, filed on Nov. 5, 2008, which claims priority from Japanese Application No. 2007-288111, filed Nov. 6, 2007, and Japanese Application No. 2008-224223, filed Sep. 2, 2008, all of which are hereby incorporated by reference herein in their entirety.

BACKGROUND OF THE INVENTION

1. Field of the Invention

The present invention relates to an image processing apparatus, particularly to an apparatus to transmit moving image data.

2. Description of the Related Art

In recent years, systems capable of dealing with audio data, image data, and other data have become widespread. Accordingly, the need for transmitting/receiving moving image data of various frame rates has been increasing. Under these circumstances, a data structure capable of changing a frame rate is specified in the MPEG (Moving Picture Expert Group) standard.

For example, in the MPEG-1 and MPEG-2 standards, a frame rate specified by a flag is selected from among encoded several frame rates (frame rate values). The MPEG-4 standard adopts a data structure in which display-time data is inserted into each frame of moving image data. With this data structure, both a fixed frame rate and a variable frame rate can be set in the MPEG-4.

Also, in recent years, there has been suggested a configuration of transmitting/receiving additional information, including a frame frequency and a horizontal synchronization frequency of image data to be output and a pixel size of an image, in a system including a computer and a display (e.g., see Japanese Patent Laid-Open No. 10-69251). Such additional information is transmitted/received in a DVI (digital visual interface) standard, for example. Thus, those parameters can be changed in the state where the power of an image data transmitting apparatus (e.g., computer) and an image data receiving apparatus (e.g., display apparatus) is turned on.

As described above, when moving image data encoded by the MPEG-1 or MPEG-2 standard is to be decoded, the frame rate can be detected only after the moving image data has been input to a decoder and a flag indicating the frame rate has been detected.

Also, when moving image data encoded by the MPEG-4 standard is to be decoded, change in frame rate can be detected only after a decoder has detected display-time information of each frame.

For this reason, in a display apparatus to display moving images corresponding to decoded moving image data, a displayed image is distorted or change of displayed images delays disadvantageously if the frame rate of the displayed moving image data changes.

In the DVI standard, it is necessary to reset or initialize an element in a transmitting/receiving apparatus, such as an image buffer, when a frame rate is changed. In this case, too, a displayed image disappears or blacks when the frame rate is changed.

SUMMARY OF THE INVENTION

The present invention is directed to solving the above-described problems and providing an apparatus capable of easily detecting change in frame rate of moving image data that is being transmitted.

According to an aspect of the present invention, an image processing apparatus includes: a moving image generating unit configured to generate moving image data; an instruction unit configured to provide a frame rate changing instruction to change a frame rate of the moving image data; a control unit configured to control the moving image generating unit in accordance with the frame rate changing instruction provided by the instruction unit such that the frame rate of the moving image data generated by the moving image generating unit is changed from a first frame rate to a second frame rate; an additional information generating unit configured to generate additional information indicating a period from a frame of the moving image data of the first frame rate to a frame rate changing point at which the frame rate of the moving image data generated by the moving image generating unit is changed from the first frame rate to the second frame rate in accordance with the frame rate changing instruction provided by the instruction unit; a multiplexing unit configured to add the additional information to the moving image data of the first frame rate generated by the moving image generating unit; and a transmitting unit configured to transmit the moving image data and the additional information output from the multiplexing unit.

Further features of the present invention will become apparent from the following description of exemplary embodiments with reference to the attached drawings.

BRIEF DESCRIPTION OF THE DRAWINGS

FIG. 3 illustrates additional information.

FIG. 4 illustrates target frame rate information.

FIG. 5 illustrates a state of transmitting countdown information.

FIG. 6 illustrates a state of transmitting countdown information.

FIG. 7 illustrates additional information.

FIG. 8 illustrates additional information.

DESCRIPTION OF THE EMBODIMENTS

Hereinafter, exemplary embodiments of the present invention are described in detail with reference to the drawings.

Figure 1:
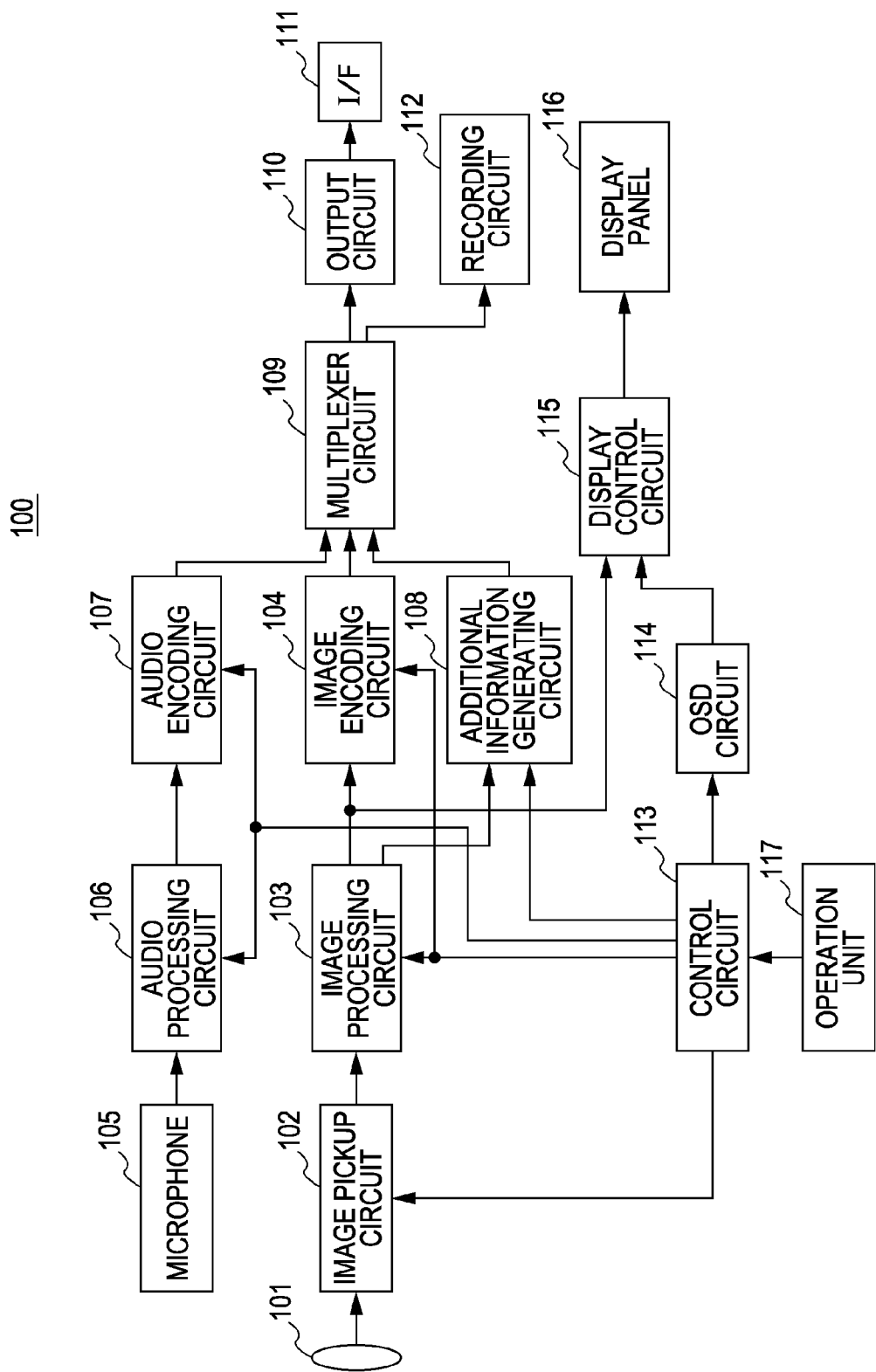
FIG. 1 illustrates a configuration of a video camera according to an embodiment of the present invention.

FIG. 1 is a block diagram illustrating a configuration of a video camera 100 according to a first exemplary embodiment of the present invention.

Referring to FIG. 1, the video camera 100 includes an optical system 101 including a lens and a lens driving motor, and an image pickup circuit 102 including an image pickup device, such as a CMOS (complementary metal oxide semiconductor) sensor, and a driving circuit therefor. The image pickup circuit 102 generates moving image data by receiving subject light from the optical system 101, converts the moving image data to digital data, and outputs the digital data. As described below, the image pickup circuit 102 changes a frame rate of moving image data to be generated, that is, the number of frames per unit time, in response to instructions from a control circuit 113.

The video camera 100 also includes an image processing circuit 103 to perform a known process on the moving image data from the image pickup circuit 102. The image processing circuit 103 outputs, every time it outputs a frame of moving image data, a timing signal indicating the output of the frame to an additional information generating circuit 108. The video camera 100 also includes an image encoding circuit 104 to encode the moving image data from the image processing circuit 103 in accordance with a known encoding method, such as an MPEG standard.

The video camera 100 also includes a microphone 105 to obtain and output audio data, an audio processing circuit 106 to perform processes including gain adjustment and noise suppression on the audio data, and an audio encoding circuit 107 to encode the audio data from the audio processing circuit 106 in accordance with a predetermined encoding method. The audio encoding circuit 107 encodes audio signals by using various known encoding methods, such as PCM (pulse-code modulation) coding or MP3 (MPEG audio layer-3) coding.

In this embodiment, a frame rate of a moving image is changed and is output, as described below. In addition, a conventionally used audio-image synchronizing method is used. Therefore, in this embodiment, the configuration of the audio processing circuit 106 and the audio encoding circuit 107 can be simplified and the cost can be reduced.

The video camera 100 also includes the additional information generating circuit 108 to generate various pieces of additional information, such as information about a frame rate of moving image data, as described below.

The video camera 100 also includes a multiplexer circuit 109 to multiplex the moving image data from the image encoding circuit 104, the audio data from the audio encoding circuit 107, and the additional information from the additional information generating circuit 108 and generate a moving image data stream in a predetermined format, an output circuit 110 to convert the moving image data stream from the multiplexer circuit 109 into a format appropriate for a transmission path and output the data stream to an interface (I/F) 111. The interface 111 transmits the moving image data stream from the output circuit 110 to an external apparatus through a transmission path. The video camera includes a recording circuit 112 to record the moving image data stream from the multiplexer circuit 109 on a recording medium (not illustrated).

The video camera 100 also includes the control circuit 113 to control the respective units in the video camera 100, an OSD (on-screen display) circuit 114 to generate OSD information to be displayed, a display control circuit 115 to display the moving image data from the image processing circuit 103 and the OSD information from the OSD circuit 114 on a display panel 116, the display panel 116 including a liquid crystal panel and a driving circuit therefore, and an operation unit 117 including various operation buttons including a capturing start button and a menu button.

In the video camera 100 having the above-described configuration, when a user operates the operation unit 117 and provides instructions to start capturing, the control circuit 113 controls the respective units to start capturing a moving image. Moving image data obtained through the capturing is output to an external apparatus via the I/F 111 and is recorded by the recording circuit 112, together with audio data and additional information.

In this embodiment, the frame rate of the moving image data output from the image pickup circuit 102 can be set and changed by a user's operation of the operation unit 117 while capturing is or is not being performed. In this embodiment, the user sets a desired frame rate from among a plurality of predetermined frame rates.

For example, when the user wants to change a frame rate while capturing is not being performed, the user operates the menu button. Accordingly, the control circuit 113 controls the OSD circuit 114 to display the operation screen illustrated in FIG. 2 on the display panel 116.

Figure 2:
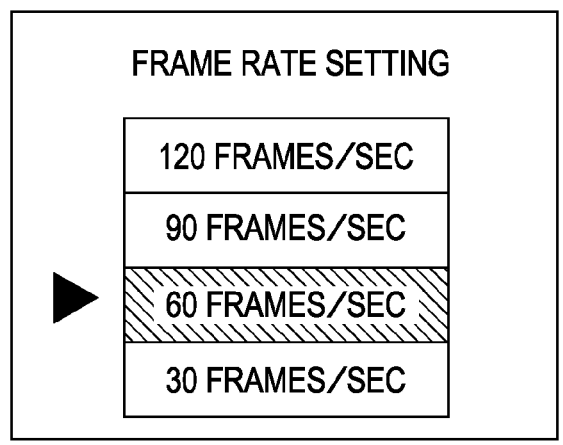
FIG. 2 illustrates a frame rate setting screen.

FIG. 2 illustrates the operation screen to provide instructions to change a frame rate.

For example, the user selects the value of a desired frame rate from among 120 frames/sec, 90 frames/sec, 60 frames/sec, and 30 frames/sec, as illustrated in FIG. 2. In the example illustrated in FIG. 2, 60 frames/sec is selected.

The image pickup device of the image pickup circuit 102 is driven in accordance with the set frame rate and generates moving image data of the set frame rate. In this embodiment, the user can arbitrarily change and set a frame rate during capturing of a moving image.

For example, when the user changes a frame rate during capturing, the frame rate sequentially changes every time the user operates a frame rate changing button of the operation unit 117.

The control circuit 113 controls the image pickup circuit 102 to allow the image pickup circuit 102 to generate moving image data of the frame rate set by the user. Also, the control circuit 113 controls the additional information generating circuit 108 to allow the additional information generating circuit 108 to generate additional information indicating the set frame rate.

When being provided with instructions to change a frame rate from the user during capturing of a moving image, the control circuit 113 controls the image pickup circuit 102 to change the frame rate of the moving image data to the specified frame rate, as described below.

Also, when being provided with instructions to change a frame rate from the user during capturing of a moving image, the control unit 113 outputs a control signal to the additional information generating circuit 108 to allow the additional information generating circuit 108 to generate additional information for the change of the frame rate. The additional information generating circuit 108 receives the control signal to change the frame rate, generates additional information in the manner described below, and outputs the additional information to the multiplexer circuit 109.

FIG. 3 illustrates additional information 300 generated by the additional information generating circuit 108. As illustrated in FIG. 3, the additional information 300 includes an option flag indicator 301, countdown information 302, and target frame rate information 303. The countdown information 302 indicates the number of frames to a frame rate change point (advance notice information of change of frame rate). The target frame rate information indicates a frame rate of moving image data information indicating a frame rate or moving image data after the frame rate change point. The additional information 300 is added to each frame of moving image data by the multiplexer circuit 109.

The option flag indicator 301 includes a frame rate change flag 301a and a target frame rate flag 301b. The option flag indicator 301 may include information other than the frame rate change flag 301a and the target frame rate flag 301b.

In this embodiment, the option flag indicator 301 is 8-bit data. The frame rate change flag 301a is composed of a 1-bit flag indicating whether the frame rate is changed or not. The target frame rate flag 301b is composed of a 1-bit flag indicating presence/absence of the target frame rate information 303. The countdown information 302 is 8-bit data. The target frame rate information 303 is 16-bit data.

FIG. 4 illustrates an example of a configuration of the target frame rate information 303. A field 303a is a field reserved for future expansion. A field 303b is a field of a target frame rate value indicating the value of a frame rate of moving image data after change of the frame rate.

For example, when the value of the frame rate change flag 301a is 1, which means the countdown information 302 exists immediately after the option flag indicator 301. When the value of the frame rate change flag 301a is 0, the countdown information 302 does not exist.

Likewise, when the value of the target frame rate flag 301b is 1, that means the target frame rate information 303 exists. When the value of the target frame rate flag 301b is 1 and when the value of the frame rate change flag 301a is 1, that means the countdown information 302 exists and also the target frame rate information 303 exists after the countdown information 302.

Next, a description is given about an additional information generating operation performed by the additional information generating circuit 108 when the user provides instructions to change a frame rate during capturing of a moving image.

In this embodiment, when the user provides instructions to change a frame rate of moving image data, the frame rate is changed after a predetermined time from the instruction. More specifically, upon receiving instructions to change a frame rate from the user, the control circuit 113 outputs the frame rate change instructions and information of the value of a target frame rate to the additional information generating circuit 108.

Upon receiving the frame rate change instructions, the additional information generating circuit 108 sets the target frame rate flag 301b of the frame next to the frame that is currently being multiplexed in the multiplexer circuit 109 to 1. Also, the additional information generating circuit 108 sets the target frame rate value as the target frame rate information 303.

For example, when the target frame rate is 120 fps, 120 is set as the target frame rate value 303b of the target frame rate information 303. Also, the additional information generating circuit 108 sets the frame rate change flag 301a to 1 and sets the number of frames to the frame rate change point as the countdown information 302. In this embodiment, the period from when instructions to change the frame rate are received to when the image pickup circuit 102 actually changes the frame rate of moving image data is 10 frames. Thus, 10 (0A in hexadecimal) is set as the countdown information 302 immediately after the instructions to change the frame rate.

The multiplexer circuit 109 adds additional information in which various pieces of information have been set to the next frame and outputs the frame with the additional information to the output circuit 110 and the recording circuit 112.

Then, the additional information generating circuit 108 decrements the value of the countdown information 302 by one every time it generates additional information of a frame and sets the value as the countdown information 302. During this time, the frame rate change flag 301a is set to 1. Then, when the value of the countdown information 302 becomes 0, the additional information generating circuit 108 sets a predetermined value, e.g., FF in hexadecimal, as the countdown information 302 of the next frame.

When being provided with instructions to change a frame rate, the control circuit 113 outputs a control signal to the image pickup circuit 102 to allow the image pickup circuit 102 to change the frame rate of moving image data to the specified value after a 10-frame period.

FIG. 5 is a schematic view of such a countdown operation. In FIG. 5, the horizontal axis indicates time. A point 501 indicates a frame rate change point of moving image data output from the image pickup circuit 102. Fields 502 to 504 correspond to the additional information 300 added to each frame to the frame rate change point 501. The values in the fields 502 to 504 are values set as the countdown information 302 in each piece of additional information.

The value of the countdown information 302 in the additional information 502 is 10 (0A), indicating that there are ten frames before the frame rate change point 501. The value of the countdown information 302 in the additional information 503 is 1 (01), indicating that there is one frame before the frame rate change point 501. The value of the countdown information 302 in the additional information 504 added to the frame immediately after the frame rate change point 501 is 0 (00). The value of the countdown information 302 in the additional information 505 of a frame after the frame rate change point 501 is a predetermined value (FF).

Now, the additional information generating operation according to this embodiment will be described.

FIG. 6 illustrates countdown information added to moving image data. Fields 603 to 605 correspond to additional information that is transmitted by being added to each frame. The values in fields 603 to 605 are values of the countdown information in each piece of additional information. A point 601 is a point where the user provides instructions to change a frame rate, whereas a point 602 indicates a frame rate change point of moving image data output from the image pickup circuit 102.

FIG. 7 illustrates the content of the additional information 603 added to the frame immediately after the instructions to change the frame rate. The frame rate change flag 301a is set to 1, and the target frame rate flag 301b is set to 1. A value of 10 (0A) is set as the countdown information 302. A value indicating the target frame rate, that is, 60 (3C) indicating 60 fps, is set as the target frame rate value 303b.

FIG. 8 illustrates the content of the additional information 604 added to the frame immediately before the frame rate change point 602. The frame rate change flag 301a is set to 1 and the target frame rate flag 301b is set to 0. Since the frame is immediately before the frame rate change point 602, 1 (01) is set as the countdown information 302. Also, since the target frame rate flag 301b is set to 0, a predetermined value (FF) is set as the target frame rate value 303b.

The target frame rate information may be transmitted once or more than once when the frame rate is changed. In this embodiment, the target frame rate information is set in the additional information of the frame immediately after the instructions to change the frame rate and is transmitted. The target frame rate information may be transmitted a plurality of times.

In the additional information 605 added to the frame immediately after the frame rate change point 602, the frame rate change flag 301a is set to 1 and the target frame rate flag 301b is set to 0. Also, since the frame is at the frame rate change point, 0 (00) is set as the countdown information 302. In the additional information 605, a predetermined value (FF) is set as a target frame rate value. The value of the countdown information 302 in the additional information 606 of a frame after the frame rate change point 602 is a predetermined value.

Figure 11:
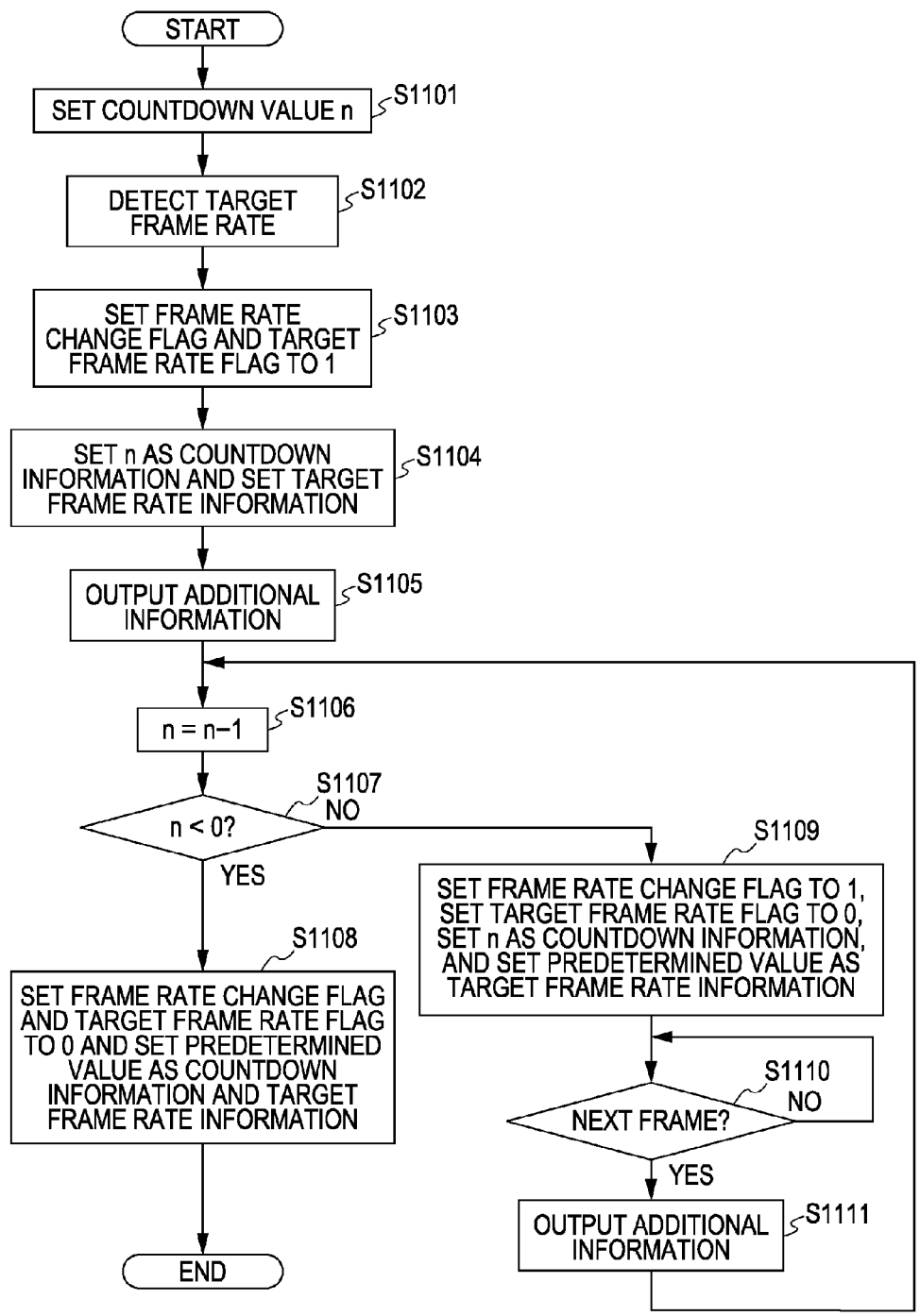
FIG. 11 is a flowchart illustrating an additional information generating process.

Hereinafter, a process performed by the additional information generating circuit 108 after reception of instructions to change a frame rate is described with reference to the flowchart illustrated in FIG. 11. The process illustrated in FIG. 11 starts upon reception of instructions to change a frame rate from the control circuit 113.

First, the additional information generating circuit 108 sets an initial value "n" of the countdown information 302 (S1101). In this embodiment, "n" is 10. Also, the additional information generating circuit 108 detects a target frame rate value transmitted from the control circuit 113 together with the instructions to change the frame rate (S1102). Then, the additional information generating circuit 108 sets the frame rate change flag 301a and the target frame rate flag 301b to 1 (S1103). Also, the additional information generating circuit 108 sets "n", that is, 10 in this case, as the countdown information 302 and also sets the target frame rate value as the target frame rate information (S1104).

Then, the additional information generating circuit 108 outputs the additional information set in the above-described manner to the multiplexer circuit 109 (S1105).

The multiplexer circuit 109 adds the additional information to the frame immediately after the instructions to change the frame rate and outputs the frame with the additional information, as described above.

Then, the additional information generating circuit 108 decrements the value of "n" by one (S1106) and determines whether "n" is less than 0 (S1107). When n<0 is satisfied, the frame is the first frame after change of the frame rate of moving image data, and thus the additional information generating circuit 108 sets the frame rate change flag 301a and the target frame rate flag 301b to 0, and also sets a predetermined value as the countdown information 302 and the target frame rate information (S1108). After that, the additional information generating circuit 108 outputs the additional information set in the above-described manner to the multiplexer circuit 109, so that the additional information is added to each frame of moving image data and is transmitted.

On the other hand, when "n" greater than or equal to 0 in step S1107, the additional information generating circuit 108 sets the frame rate change flag 301a to 1, sets the target frame rate flag 301b to 0, sets "n" as the countdown information 302, and sets a predetermined value FF as the target frame rate information (S1109).

Then, after detecting that a next frame has been output from the image processing circuit 103 based on a timing signal from the image processing circuit 103 (S1110), the additional information generating circuit 108 outputs the additional information set in step S1109 to the multiplexer circuit 109 (S1111). The multiplexer circuit 109 adds the additional information output in this way to the next frame and outputs the frame with the additional information.

In the case where the image encoding circuit 104 encodes moving image data by using bidirectional predictive interframe encoding, such as the MPEG, the order of frames output from the image processing circuit 103 is different from the order of frames output from the image encoding circuit 104.

In that case, the multiplexer circuit 109 holds additional information output from the additional information generating circuit 108. Then, the multiplexer circuit 109 adds the additional information to the respective frames of moving image data output from the image encoding circuit 104 so that the countdown information 302 is counted down in accordance with the order displayed, and outputs the frames with the additional information.

Figure 9:
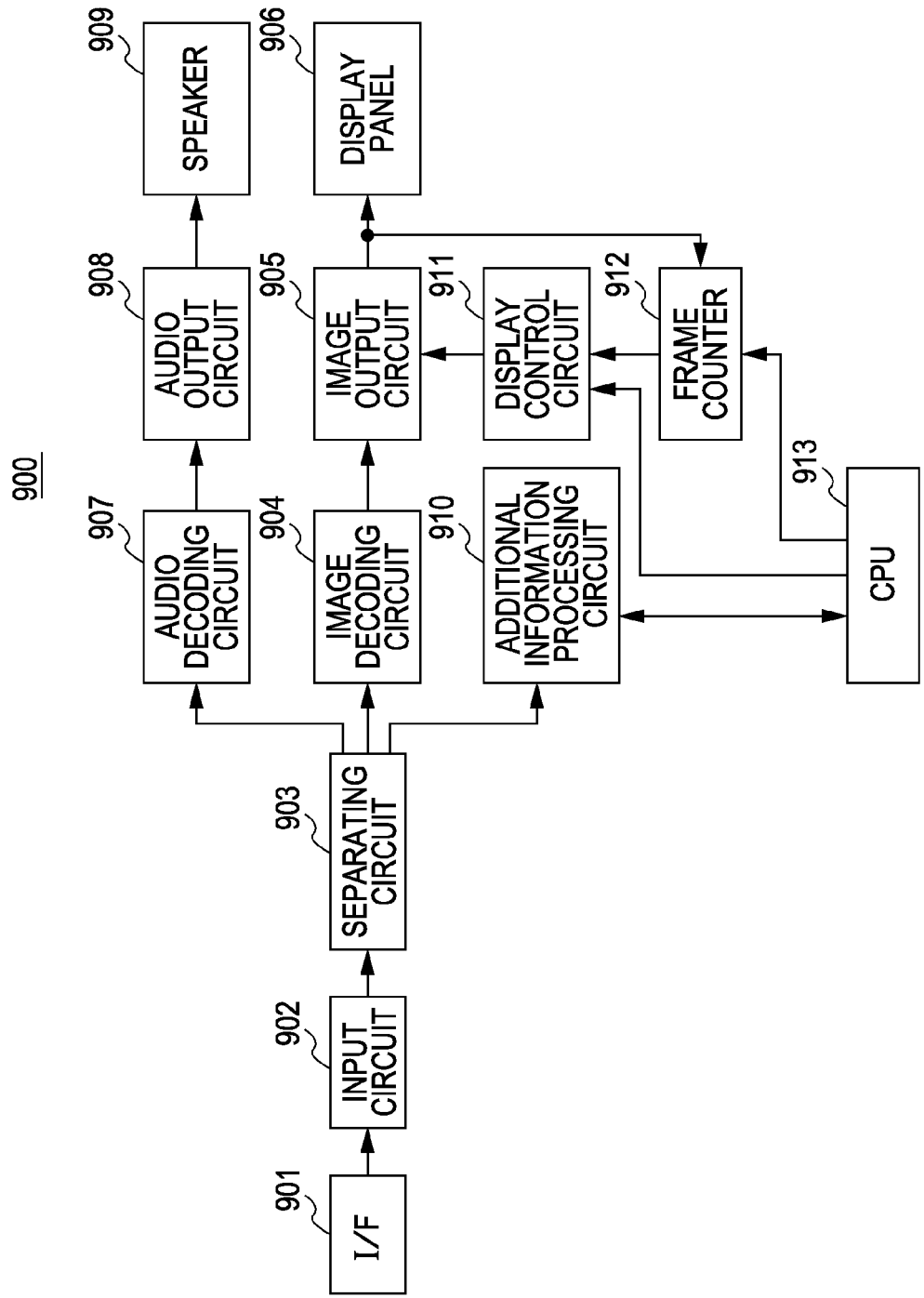
FIG. 9 illustrates a configuration of a display apparatus according to the embodiment of the present invention.

Next, a display apparatus to receive a moving image data stream transmitted from the video camera 100 illustrated in FIG. 1 and display a moving image is described. FIG. 9 illustrates a configuration of a display apparatus 900.

Referring to FIG. 9, the display apparatus 900 includes an interface (I/F) 901 to receive a moving image data stream transmitted from the video camera 100, an input circuit 902 to input the moving image data stream received by the I/F 901, and a separating circuit 903 to detect audio data, moving image data, and additional information from the input moving image data stream and supply them to an audio decoding circuit 907, an image decoding circuit 904, and an additional information processing circuit 910, respectively.

The audio decoding circuit 907 decodes encoded audio data from the separating circuit 903. The audio data decoded by the audio decoding circuit 907 is supplied to a speaker 909 via an audio output circuit 908 including a D/A converter and an audio amplifier circuit.

The image decoding circuit 904 decodes encoded moving image data from the separating circuit 903. The moving image data decoded by the image decoding circuit 904 is output to the image output circuit 905. The image output circuit 905 has a buffer memory and accumulates a predetermined number of frames of decoded moving image data. Then, the image output circuit 905 reads the moving image data at specified timing and displays a moving image on a display panel 906.

An additional information processing circuit 910 receives additional information from the separating circuit 903 and analyzes the content thereof. Then, the additional information processing circuit 910 detects the above-described various pieces of information related to change of a frame rate and outputs the detected information to a CPU (central processing unit) 913.

Specifically, when the frame rate change flag 301a is set to 1, the additional information processing circuit 910 notifies the CPU 913 of the fact, and also detects the value of the countdown information 302 and outputs the value to the CPU 913.

When the target frame rate flag 301b is set to 1, the additional information processing circuit 910 notifies the CPU 913 of the fact, and also outputs the value of the target frame rate information to the CPU 913.

The CPU 913 provides for change of a frame rate based on such a detection result generated by the additional information processing circuit 910. That is, the CPU 913 outputs the value of the target frame rate value 303b that is detected together with the value of the target frame rate flag 301b to a display control circuit 911.

The CPU 913 also supplies the value of the countdown information 302 that is detected together with the value of the frame rate change flag 301a to a frame counter 912. Every time countdown information is supplied from the CPU 913, the frame counter 912 is set at the value of the countdown information. Then, the set count value is output to the display control circuit 911.

As described above, the countdown information 302 is added to all the frames, "n" frames before the frame rate change point. However, it is possible that the countdown information 302 is not detected due to a transmission error or the like. For this reason, the frame counter 912 decrements a count value by one every time a frame of image is output from the image output circuit 905 after the countdown information has been set by the CPU 913.

Accordingly, only if the countdown information 302 added to any of the "n" frames before the frame rate change point can be detected, the period to the frame rate change point can be counted. When the count value becomes 0, the frame counter 912 outputs a control signal indicating change of the frame rate to the display control circuit 911. The display control circuit 911 controls output timing of moving image data from the image output circuit 905 based on the change control signal from the frame counter 912.

Figure 10:
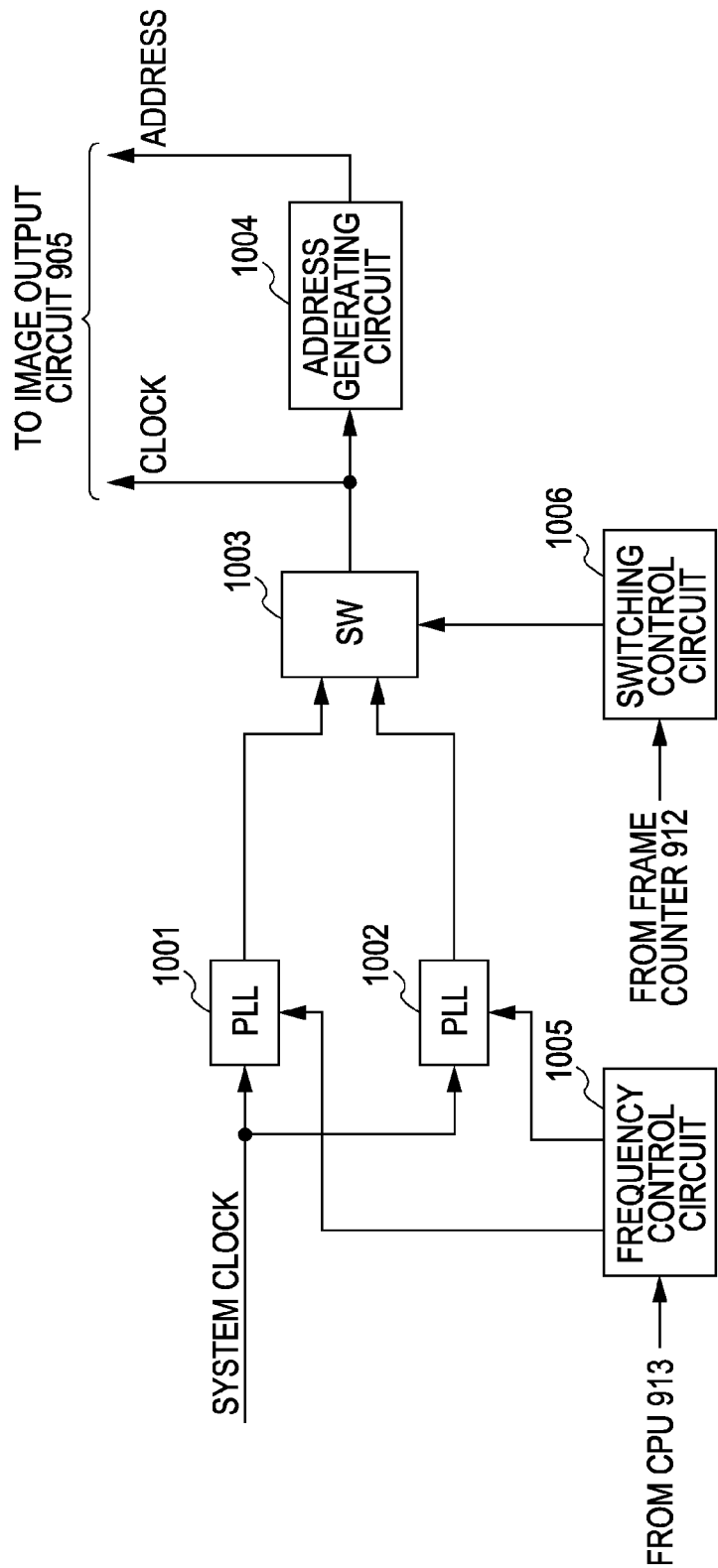
FIG. 10 illustrates a configuration of a display control circuit.

FIG. 10 is a block diagram illustrating a configuration of the display control circuit 911.

Referring to FIG. 10, information of a frame rate of moving image data that is currently input and target frame rate information are supplied from the CPU 913 to a frequency control circuit 1005. Also, a system clock of a predetermined frequency is supplied to PLL (phase-locked loop) circuits 1001 and 1002, which generate an operation clock synchronizing the system clock. The frequency control circuit 1005 sets a center frequency of the operation clocks generated by the PLL circuits 1001 and 1002 based on the frame rate information supplied from the CPU 913. The operation clocks output from the PLL circuits 1001 and 1002 are supplied to a switch 1003.

A switching control signal from the frame counter 912 is supplied to a switching control circuit 1006, and switching between the clock from the PLL circuit 1001 and the clock from the PLL circuit 1002 is performed based on the switching control signal. The operation clock from the switch 1003 is supplied to the image output circuit 905 and an address generating circuit 1004.

The address generating circuit 1004 generates a read address of the buffer memory in the image output circuit 905 based on the clock output from the switch 1003 and outputs the read address. The image output circuit 905 reads the image data in the read address from the address generating circuit 1004 from the buffer memory in accordance with the clock from the switch 1003 and outputs the image data to the display panel 906.

Now, a description will be given about an operation of changing a frame rate of input moving image data performed in the display apparatus 900. It is assumed that the operation clock from the PLL circuit 1001 is selected by the switch 1003 while moving image data that is currently input is being displayed.

It is also assumed that a moving image data stream including the target frame rate information illustrated in FIG. 7 is input from the video camera 100 at this time. The CPU 913 outputs the target frame rate information to the frequency control circuit 1005. The frequency control circuit 1005 sets a center frequency of the PLL circuit 1002 on the basis of the target frame rate information.

In an ordinary case, time delay occurs after a frequency has been changed until operation is stabilized in a PLL circuit. In this embodiment, the number of frames before change of the frame rate based on the countdown information is set to a sufficiently longer time period than the time period necessary to stabilize the operation of the PLL circuit 1002.

After the target frame rate information has been supplied from the CPU 913 and after the center frequency has been changed by the frequency control circuit 1005, the PLL circuit 1002 starts an operation to lock the frequency to the frequency set by the CPU 913.

The switching control circuit 1006 controls switching timing of the switch 1003 based on the switching control signal from the frame counter 912. That is, at the same time when the countdown information becomes 0, a switching control signal is supplied from the frame counter 912 to the switching control circuit 1006. The switching control circuit 1006 selects the clock output from the PLL circuit 1002 in response to the switching control signal and outputs the clock. Then, the selected clock is supplied to the address generating circuit 1004 and the image output circuit 905.

With the above-described operation, according to this embodiment, the output clock of the PLL circuit 1002 that is stably operating is supplied to the image output circuit 905 and the address generating circuit 1004 at the frame rate change point.

In this embodiment, a clock corresponding to a target frame rate is used as a read clock of the image output circuit 905 after change of the frame rate and as an operation clock of the address generating circuit 1004. With this operation, an address supplying operation of the address generating circuit 1004 and an operation of reading image data from the image output circuit 905 are specified by an operating frequency after change of the frame rate.

In this way, according to this embodiment, a frame rate can be smoothly changed. Also, degradation in image quality, such as blackening of a displayed image and display delay, can be advantageously minimized.

In this embodiment, output of audio data is synchronized with output of image data by a synchronizing circuit (not illustrated). In the case where the audio data is voice data of a subject, so-called lip sync is realized. For such synchronization between audio data and image data, many known methods can be adopted, and thus a detailed description thereof is omitted herein. A concept of a frame rate is unnecessary for output of audio data, and only simple delay control is performed.

As described above, according to this embodiment, when instructions to change a frame rate are provided, the number of frames before a frame rate change point and a target frame rate are added as advance notice information of changing the frame rate to moving image data and are transmitted. Thus, an apparatus on the receiver side can detect whether the frame rate is changed or not, timing of change, and a target frame rate before actually receiving moving image data having the target frame rate. Accordingly, the apparatus on the receiver side can provide for change of the frame rate of moving image data, so that an operation of changing a display frame rate can be smoothly performed.

In this embodiment, the countdown information is added to ten frames before the frame rate change point, but the present invention is not limited to this value. Countdown may be performed starting from any value as long as the apparatus on the receiver side can smoothly change a display frame rate. In that case, however, the control circuit 113 controls the image pickup circuit 102 so that the timing when the countdown information becomes 0 synchronizes the timing of changing the frame rate of moving image data in the image pickup circuit 102.

In this embodiment, the target frame rate value 303b and the value of the countdown information 302 are separately set. Alternatively, those values may be set simultaneously.

In this embodiment, when instructions to change a frame rate are provided, the frame rate is not immediately changed, but countdown information is transmitted as advance notice information indicating the time period to the frame rate change point. Then, at the timing when the countdown information is set to 0, the frame rate of moving image data is changed. Accordingly, countdown information can be added to respective frames before the frame rate change point without accumulating moving image data during a countdown period.

Alternatively, moving image data may be accumulated while the countdown information is transmitted, and the frame rate may be changed from the next frame upon reception of instructions to change the frame rate. That is, a buffer memory capable of storing moving image data output from the image encoding circuit 104 or the image processing circuit 103 during a period necessary for countdown is provided, and the moving image data is accumulated in this buffer memory.

Then, when instructions to change the frame rate are provided, countdown information indicating the position with respect to the frame rate change point may added to the respective frames of the moving image data accumulated in the buffer memory, and may be transmitted.

In the case where a moving image data steam is not output from the I/F 111 but is recorded on a recording medium by the recording circuit 112, the moving image data stream may not be accumulated in the buffer memory and the additional information of the data recorded on the recording medium may be rewritten. At that time, the moving image data is not recorded in an original form, and the additional information may be recorded as control information of the moving image data stream in a recording area different from the area where the moving image data is recorded.

Hereinafter, a second exemplary embodiment will be described. In the second embodiment, the configuration of the video camera 100 and the content of additional information that is transmitted together with moving image data are the same as those in the first embodiment, and thus, a detailed description is omitted herein.

In the second embodiment, the number of frames to which countdown information is added in response to instructions to change a frame rate is set in accordance with the frame rate of moving image data that is being generated and transmitted when the instructions are provided. That is, as the frame rate of the moving image data that is being transmitted at the time when the instructions to change the frame rate are provided is higher, the number of frames to which countdown information is added is larger.

Specifically, in the first embodiment, 10 is set as the countdown information "n" when instructions to change the frame rate are provided, and then the countdown information is decremented by one for each frame. In the second embodiment, 10 is set as "n" when the frame rate of the moving image data that is currently being transmitted is 30 frames/sec. When the frame rate of the moving image data that is currently being transmitted is 60 frames/sec, 20 is set as "n" and additional information is transmitted from 20 frames before the frame rate change point. When the frame rate of the moving image data that is currently being transmitted is 90 frames/sec, 30 is set as "n" and additional information is transmitted from 30 frames before the frame rate change point. When the frame rate of the moving image data that is currently being transmitted is 120 frames/sec, 40 is set as "n" and additional information is transmitted from 40 frames before the frame rate change point.

In this way, according to the second embodiment, the period for transmitting additional information is changed so that the periods to the frame rate change point when countdown information is added are substantially uniformed regardless of a current frame rate.

Figure 12:
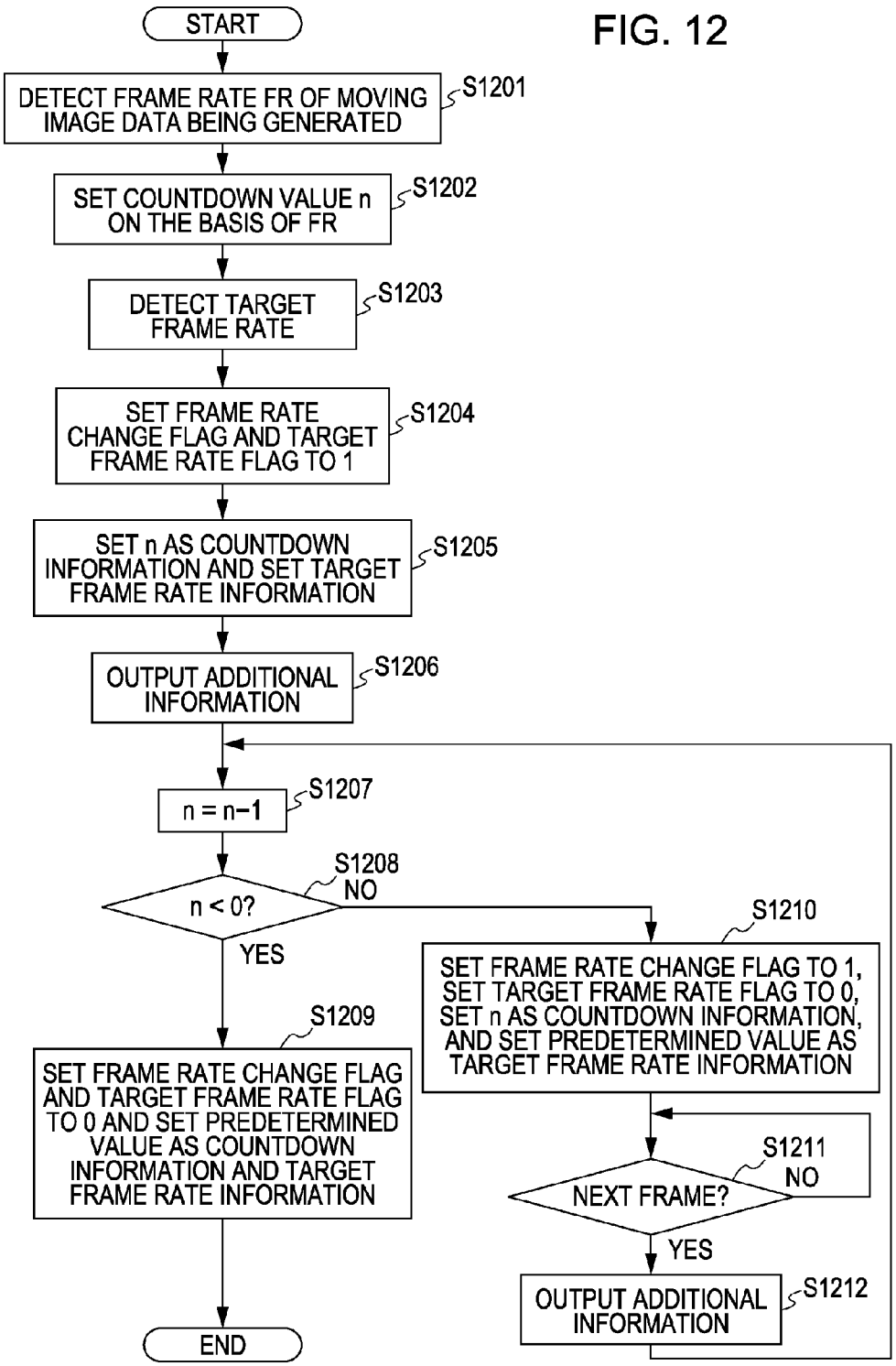
FIG. 12 is a flowchart illustrating an additional information generating process.

FIG. 12 is a flowchart illustrating a process performed by the additional information generating circuit 108 after instructions to change a frame rate have been provided. The process illustrated in FIG. 12 starts upon reception of instructions to change a frame rate from the control circuit 113.

After instructions to change a frame rate have been provided, the additional information generating circuit 108 detects the frame rate FR of the moving image data that is currently being generated (S1201), and then sets an initial value "n" of the countdown information 302 in the manner as described above on the basis of the detected value of FR (S1202). Steps S1203 to S1212 are the same as steps S1102 to S1111 in FIG. 11, and as such, a detailed description will not be repeated herein.

According to this embodiment, the period to the frame rate change point when the countdown information is added is changed on the basis of the current frame rate when instructions to change the frame rate are provided. Therefore, the periods to the frame rate change point when the countdown information is added can be substantially uniformed regardless of the current frame rate.

Accordingly, when an operation clock is to be generated by the PLL circuit in the display apparatus that has received moving image data, a stable clock can be generated at the frame rate change point regardless of the frame rate before change.

In the above-described first and second embodiments, additional information is transmitted regardless of instructions to change a frame rate. Alternatively, additional information may be generated and transmitted by being added to moving image data only in a period from when instructions to change the frame rate are provided to the frame rate change point.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An image processing apparatus, comprising:
a moving image generating unit configured to generate moving image data;
an instruction unit configured to provide a frame rate changing instruction to change a frame rate of the moving image data;
a control unit configured to control the moving image generating unit in accordance with the frame rate changing instruction provided by the instruction unit such that the frame rate of the moving image data generated by the moving image generating unit is changed from a first frame rate to a second frame rate;
an additional information generating unit configured to generate additional information indicating a period from a frame of the moving image data of the first frame rate to a frame rate changing point at which the frame rate of the moving image data generated by the moving image generating unit is changed from the first frame rate to the second frame rate in accordance with the frame rate changing instruction provided by the instruction unit;
a multiplexing unit configured to add the additional information to the moving image data of the first frame rate generated by the moving image generating unit,
wherein the multiplexing unit starts to add the additional information to each frame of the moving image data of the first frame rate from a predetermined period before the frame rate changing point,
wherein a value of the additional information added to the moving image data of the first frame rate is decremented by one at every frame; and
a transmitting unit configured to transmit the moving image data and the additional information output from the multiplexing unit.

2. The image processing apparatus according to claim 1, wherein the additional information generating unit starts to generate the additional information from n frames before the frame rate changing point, wherein n is an integer having a value greater than or equal to one, and wherein the multiplexing unit starts to add the additional information to the moving image data of the first frame rate from the n frame before the frame rate changing point.

3. An image processing apparatus, comprising:
an obtaining unit configured to obtain moving image data, a frame rate of the moving image data changing from a first frame rate to a second frame rate;
a generating unit configured to generate additional information indicating the second frame rate;
a multiplexing unit configured to add the additional information generated by the generating unit to the moving image data of the first frame rate,
wherein the multiplexing unit adds the additional information to a plurality of frames of a predetermined period immediately before a frame rate changing point at which the frame rate of the moving image data is changed from the first frame rate to the second frame rate; and
an output unit configured to output the moving image data and the additional information output from the multiplexing unit.

4. The image processing apparatus according to claim 3, wherein the multiplexing unit adds the additional information to n frames immediately before the frame rate changing point, wherein n is an integer having a value greater than or equal to one, and wherein the multiplexing unit determines the value of n based on a value of the first frame rate.

5. An image processing apparatus, comprising:
an obtaining unit configured to obtain moving image data, a frame rate of the moving image data changing from a first frame rate to a second frame rate;
a generating unit configured to generate additional information relating to a period from a frame of the moving image data of the first frame rate to a frame rate changing point at which the frame rate of the moving image data generated by the moving image generating unit is changed from the first frame rate to the second frame rate;
a multiplexing unit configured to add the additional information generated by the generating unit to the moving image data of the first frame rate,
wherein the multiplexing unit adds the additional information to a plurality of frames of a predetermined period immediately before the frame rate changing point; and
an output unit configured to output the moving image data and the additional information output from the multiplexing unit.

6. The image processing apparatus according to claim 5, wherein the generating unit generates the additional information indicating a number of frames from each of the plurality of frames of the predetermined period to the frame rate changing point, and
wherein the multiplexing unit adds the additional information to each of the plurality of frames of the predetermined period.

7. A method for an image processing apparatus, the method comprising:
generating moving image data;
providing a frame rate changing instruction to change a frame rate of the moving image data;
controlling the generating in accordance with the provided frame rate changing instruction such that the frame rate of the generated moving image data is changed from a first frame rate to a second frame rate;
generating additional information indicating a period from a frame of the moving image data of the first frame rate to a frame rate changing point at which the frame rate of the generated moving image data is changed from the first frame rate to the second frame rate in accordance with the provided frame rate changing instruction;
adding, in an adding step, the additional information to the moving image data of the generated first frame rate,
wherein the adding step starts to add the additional information to each frame of the moving image data of the first frame rate from a predetermined period before the frame rate changing point,
wherein a value of the additional information added to the moving image data of the first frame rate is decremented by one at every frame; and
transmitting the moving image data and the additional information output from the adding step.

8. A method for an image processing apparatus, the method comprising:
obtaining moving image data, a frame rate of the moving image data changing from a first frame rate to a second frame rate;
generating additional information relating to a period from a frame of the moving image data of the first frame rate to a frame rate changing point at which the frame rate of the generated moving image data is changed from the first frame rate to the second frame rate;
adding, in an adding step, the generated additional information to the moving image data of the first frame rate,
wherein the adding step adds the additional information to a plurality of frames of a predetermined period immediately before the frame rate changing point; and
outputting the moving image data and the additional information output from the adding step.

9. A method for an image processing apparatus, the method comprising:
obtaining moving image data, a frame rate of the moving image data changing from a first frame rate to a second frame rate;
generating additional information indicating the second frame rate;
adding, in an adding step, the additional information generated by a generating unit to the moving image data of the first frame rate,
wherein the adding step adds the additional information to a plurality of frames of a predetermined period immediately before a frame rate changing point at which the frame rate of the moving image data is changed from the first frame rate to the second frame rate; and
outputting the moving image data and the additional information output from the adding step.

* * * * *